United States Patent
Kipper et al.

(10) Patent No.: US 8,302,058 B1
(45) Date of Patent: Oct. 30, 2012

(54) REDUCING SIMULTANEOUS SWITCHING NOISE IN AN INTEGRATED CIRCUIT DESIGN DURING PLACEMENT

(75) Inventors: Michael Howard Kipper, Thornhill (CA); Joshua David Fender, East York (CA); Navid Azizi, Markham (CA)

(73) Assignee: Altera Corporation, San Jose, CA (US)

( * ) Notice: Subject to any disclaimer, the term of this patent is extended or adjusted under 35 U.S.C. 154(b) by 386 days.

(21) Appl. No.: 12/557,798

(22) Filed: Sep. 11, 2009

(51) Int. Cl.
*G06F 17/50* (2006.01)

(52) U.S. Cl. ......... 716/122; 716/110; 716/118; 716/119

(58) Field of Classification Search .......... 716/118–125, 716/110–111, 113, 115
See application file for complete search history.

(56) References Cited

U.S. PATENT DOCUMENTS

| | | | |
|---|---|---|---|
| 6,434,733 B1 * | 8/2002 | Duggirala et al. ............ | 716/124 |
| 7,299,444 B1 * | 11/2007 | Tai et al. ....................... | 716/117 |
| 7,412,668 B1 * | 8/2008 | Duong ........................... | 716/108 |
| 7,788,620 B1 * | 8/2010 | Xue et al. ...................... | 716/113 |
| 7,895,555 B1 * | 2/2011 | West et al. .................... | 716/108 |
| 7,949,977 B2 * | 5/2011 | Kouzaki et al. ............... | 716/115 |
| 7,983,880 B1 * | 7/2011 | Fender et al. .................... | 703/2 |
| 7,992,119 B1 * | 8/2011 | Iotov et al. .................... | 716/119 |
| 2008/0027662 A1 * | 1/2008 | Kouzaki et al. ................ | 702/57 |

\* cited by examiner

*Primary Examiner* — Stacy Whitmore

(74) *Attorney, Agent, or Firm* — Womble Carlyle Sandridge & Rice, LLP

(57) ABSTRACT

Methods, computer programs, and Integrated Circuits (IC) for minimizing Simultaneous Switching Noise (SSN) in the design of an IC are presented. In one embodiment, the method includes moving a candidate pin of the IC in an initial input/output (I/O) layout to create a candidate I/O layout. Further, in one operation the method calculates a first performance cost for the initial I/O layout and a second performance cost for the candidate I/O layout. The first and the second performance costs are based on an SSN cost for the initial layout and on an SSN cost for the candidate layout respectively. The method selects the layout to design the IC that has the lowest performance cost. The method operations are performed during the placement phase of an IC Computer Aided Design (CAD) tool.

18 Claims, 8 Drawing Sheets

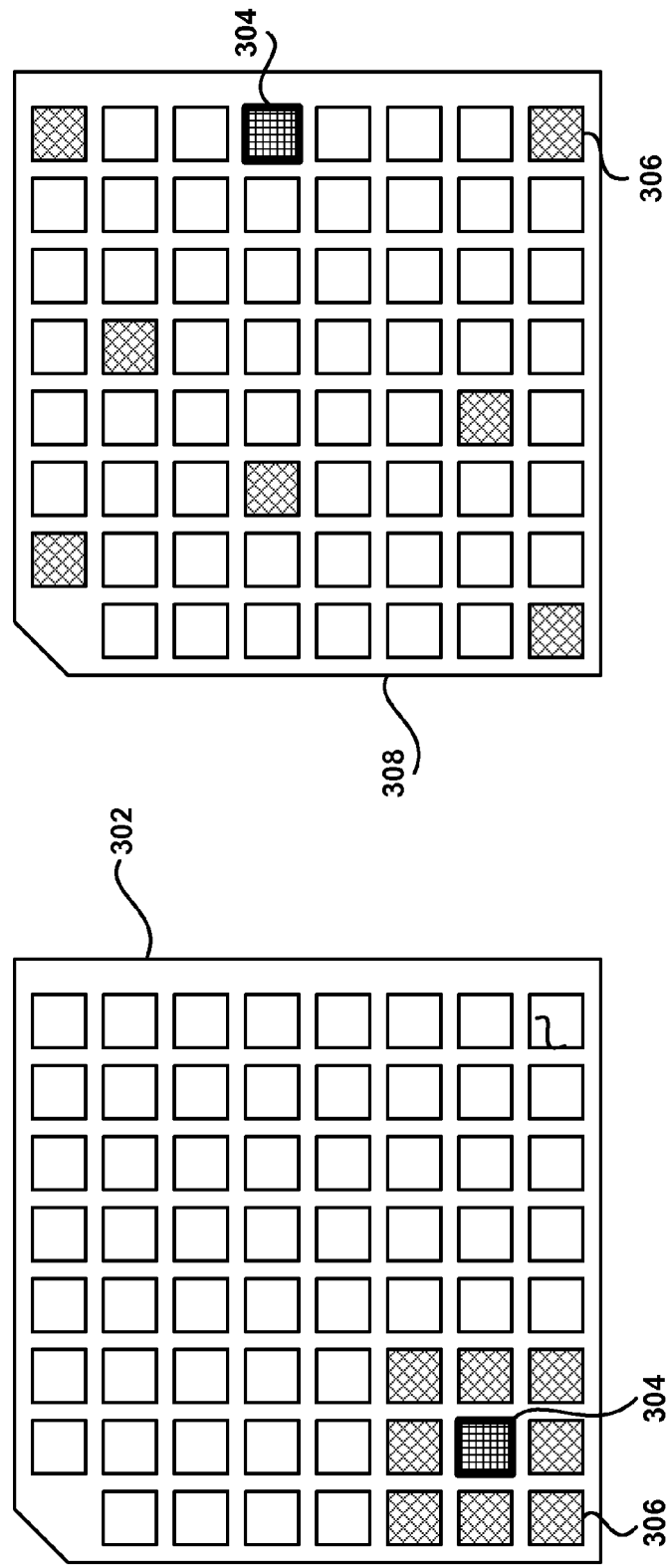

Cost pin i = $\sum cost_j$ = 636

Cost pin i = Σ cost_j = 240

REDUCING SIMULTANEOUS SWITCHING NOISE IN AN INTEGRATED CIRCUIT DESIGN DURING PLACEMENT

BACKGROUND

Simultaneous switching noise (SSN) is defined as a noise voltage induced onto a single victim Input/Output (I/O) pin of an electronic component due to the switching behavior of other aggressor I/O pins in the device. This noise is considered in the context of either an output I/O driver victim or an input I/O buffer victim.

It is a difficult task to verify that a system design, under the influence of SSN, meets a required noise margin. Existing simulation techniques can be used to predict the magnitude of a noise event caused by a given set of aggressor signals on a victim pin, but as the complexity and size of Integrated Circuits (IC) grow, so does the amount of time required to perform SSN analysis on a circuit design, which can be in the order of hours or days. In practice, this translates as a limit to the number of possible IO layouts that a circuit designer can test using SSN techniques because the designer needs to make changes to the circuit design, run the Computer Aided Design (CAD) tool again, and then perform the SSN analysis on the new design.

Current design tools tend to clump pins together as other performance metrics tend to improve in this layout. This is done at the expense of increasing SSN, which tends to increase as pins are clumped together.

It is in this context that embodiments of the invention arise.

SUMMARY

Embodiments of the present invention provide methods, computer programs, and Integrated Circuits (IC) for minimizing Simultaneous Switching Noise (SSN) in the design of an IC. It should be appreciated that the present invention can be implemented in numerous ways, such as a process, an apparatus, a system, a device or a method on a computer readable medium. Several inventive embodiments of the present invention are described below.

In one embodiment, the method includes moving a candidate pin of the IC in an initial Input/Output (I/O) layout to create a candidate I/O layout. Further, the method calculates a first performance cost for the initial I/O layout and a second performance cost for the candidate I/O layout. The first and the second performance costs are based on an SSN cost for the initial layout and an SSN cost for the candidate layout, respectively. After calculating the performance costs, the method selects the layout for the IC that with the lowest performance cost. The method operations are performed during the placement phase of an IC Computer Aided Design (CAD) tool in one embodiment. In another embodiment, an IC is designed by performing the method operations.

In yet another embodiment, a computer program embedded in a computer-readable storage medium, when executed by one or more processors, minimizes SSN in the design of an IC. The computer program includes program instructions for moving a candidate pin of the IC in an initial I/O layout to create a candidate I/O layout. The computer program also includes program instructions for calculating a first SSN cost for the initial I/O layout and a second SSN cost for the candidate I/O layout. Further, program instructions in the computer program select a layout to design the IC with the lowest SSN cost. The computer program performs placement operations in an IC CAD tool.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 3 shows an Input/Output (I/O) pin layout with high Simultaneous Switching Noise (SSN) on a victim pin.

FIG. 4 shows an I/O pin layout with lower SSN impact on the victim pin than in the layout of FIG. 3.

DETAILED DESCRIPTION

The following embodiments describe a method and apparatus for minimizing Simultaneous Switching Noise (SSN) in the design of an Integrated Circuit (IC) during the placement phase of a Computer Aided Design (CAD) tool. It will be obvious, however, to one skilled in the art, that the present invention may be practiced without some or all of these specific details. In other instances, well known process operations have not been described in detail in order not to unnecessarily obscure the present invention.

Embodiments of the invention provide extensions to the IC CAD flow that incorporates SSN minimization as an optimization goal. This is achieved by modifying the IC CAD tool to consider the effect of SSN when deciding to move a pin during placement. An SSN cost term is added to Simulated Annealing (SA) techniques in the tool to ensure that SSN is taken into account when deciding to accept or reject a move. In one embodiment, a proxy metric is used to estimate the SSN impact of a move because using the existing SSN Analyzer during the placement phase of the CAD tool would be runtime prohibitive.

It should be appreciated that the embodiments presented below describe how to minimize SSN during placement. However, the principles presented here can be used to minimize SSN during other phases of the IC design process, as long as the principles of the invention are embodied in the process. Thus, the embodiments presented should therefore not be interpreted to be exclusive or limiting, but rather exemplary or illustrative.

Figure 1:
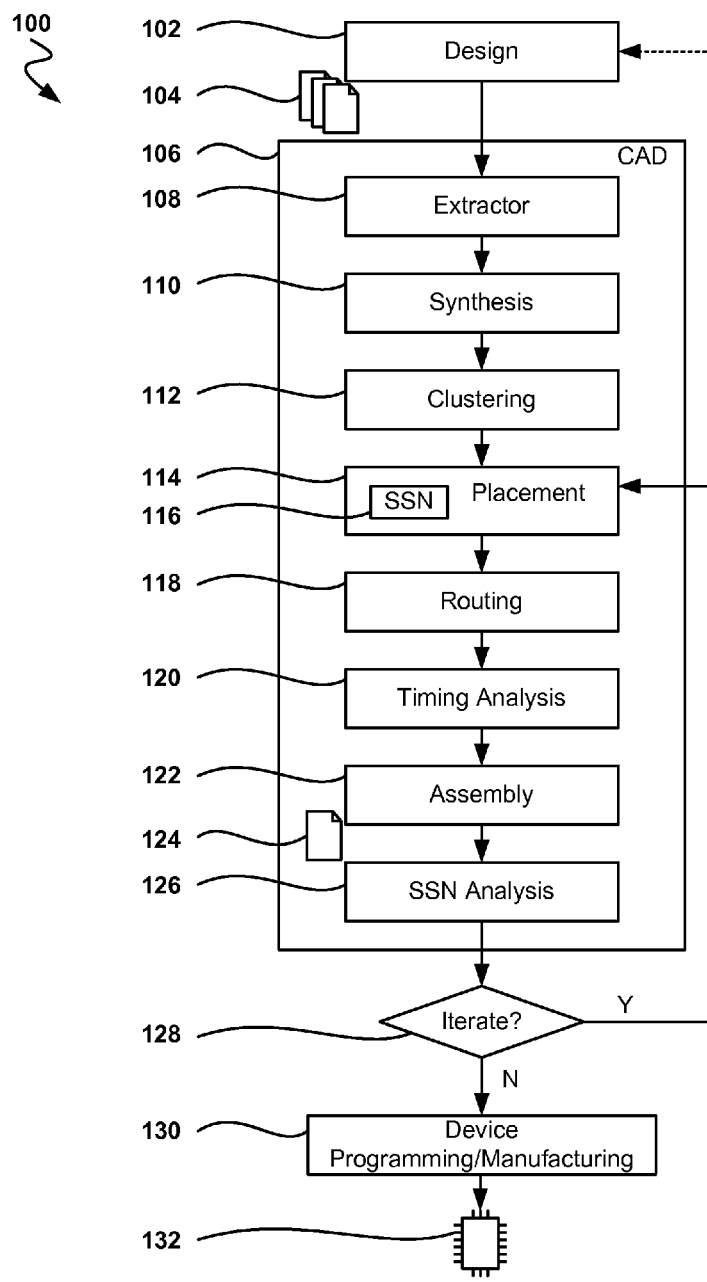
FIG. 1 illustrates the method operations required to program or manufacture an Integrated Circuit (IC) using a Computer Aided Design (CAD) tool in accordance with one embodiment of the invention.

FIG. 1 illustrates the method operations required to program or manufacture IC 132 using CAD tool 106 in accordance with one embodiment of the invention. The process starts with design 102 where a hardware engineer creates HDL files 104 containing the desired circuitry description. HDL files are used by CAD tool 106 to create the IC design. The first operation of CAD tool 106 is performed by extractor 108 by parsing HDL files 104 and creating a basic discrete netlist of logic-gate primitives. After extractor 108, synthesis 110 optimizes the basic netlist.

Clustering 112 takes a number of small blocks and puts them into clusters so following improvements are done at a cluster level. For example, a register associated with an Input/Output (I/O) pin may be clustered with the I/O pin. If the I/O pin were moved to improve SSN, the associated register would move with the I/O pin because of the clustering. Placement module 114 assigns exact locations for various circuit components within the chip's core area. Placement module 114 is sometimes referred to as the placer. Embodiments of the invention include SSN estimation logic 116 to improve the placement of the I/O pins by moving SSN sensitive pins away from aggressors that could induce harmful amounts of noise. An SSN aware Placement module 114 attempts to optimize core logic performance and SSN performance simultaneously. For example, moving pins further away from each other yields good results for SSN optimization but it is ineffective on its own. In particular, pin optimization fails to take into account other factors, such as timing, which may cause the device to fail due to a bad pin placement. Further details on how to use SSN estimation logic during Placement module 114 are described below. Placement module 114 uses Simulated Annealing, a common algorithm in IC CAD tools. SA is a probabilistic heuristic for the global optimization problem of applied mathematics, namely locating a good approximation to the global minimum of a given function in a large search space. For certain problems, SA may be more effective than exhaustive enumeration, provided that the goal is merely to find an acceptably good solution in a fixed amount of time rather than finding the best possible solution.

SA starts with a legal placement and generates possible moves. Each move creates a new layout which is compared with the previous layout to determine if the new layout is better. With SA there is a probability that a "bad move" will be accepted. The probability, also referred to as temperature in the SA algorithm, is lowered over time so bad moves are less likely as the algorithm progresses.

Embodiments of the invention use an SSN cost in the SA placement algorithm to improve SSN in the resulting design. A proxy metric for SSN is used because doing a full SSN analysis 126 during placement would be runtime prohibitive. The placement module starts with a legal non-optimized placement and attempts to move or swap blocks in that placement in an attempt to improve device performance. These moves can either be directed to improve a specific region, path, or metric, or the moves can be generated at random. Each move is evaluated by calculating the cost of performing the move, and if the cost is favorable then the move is accepted. This process of moving pins and estimating cost is repeated until the placement module determines the end of the block-moving process.

Many cost metrics can be considered by the placement module. These cost metrics may include a measure of area, timing, power or some other performance metric that the system wants to improve. A person skilled in the art will appreciate that although the embodiments presented herein describe an SSN cost, other types of cost are evaluated during placement. Typically, a weighted average of several metrics is used during SA. Each calculated cost is multiplied by a cost factor in order to give the calculated cost a relative weighting to calculate a global cost for all the performance metrics being considered. A global delta cost is computed by subtracting from the global cost obtained after the move the global cost obtained before the move. If the global delta cost is negative, meaning that overall the placement was improved by the move, the move is accepted. This means that a move may be bad for one metric but good for another metric and the move may be accepted subject to the relative weight and magnitude of the respective costs.

After Placement module 114, Routing 118 adds all wires needed to properly connect all of the placed components while obeying all design rules. Following placement and routing operations, Timing Analysis 120 computes the path lengths in the circuits and estimates how the delays relate to the constraints of the circuit. Assembly 122 follows Timing Analysis 120 and produces binary file 124 with a description of the circuit that can be used during device programming/manufacturing 130 of IC 132. The resulting binary file 124 is stored in non-volatile memory for later retrieval by the device programming or manufacturing process 130.

SSN Analysis 126 estimates the SSN on I/O pins of the device and makes the results available to the hardware designer. A full SSN Analysis 126 is a computer-resource intensive process that estimates SSN on the I/O pins by analyzing multiple factors such as signal propagation, electrical properties of the circuit, impact by buffers and transmission lines, etc. In operation 128, a decision is made as to whether a new iteration of the design creation is desired, for example to reduce SSN. If a new iteration is desired, the process typically flows back to placement 114 because it is not necessary to re-run Extractor 108 and Synthesis 110 again. In some instances, the design engineer submits small changes to the functionality of a design after the design has been fully compiled. These small changes are commonly referred to as Engineering Change Orders (ECOs), which can result in substantial compile-time savings for small changes to the design by avoiding a full new compilation and by leveraging previous CAD tool calculations. However, if the HDL files 104 are being changed then the process would flow back to design 102 for a complete new iteration. If a new iteration is not desired, the method flows to operation 130 where the device is programmed or manufactured with the created design. IC 132 is produced during the device programming/manufacturing process 130 according to the instructions defined in binary file 124. One skilled in the art will appreciate that any commercially available Electronic Design Automation (EDA) tool may utilize the embodiments described herein.

Figure 2:
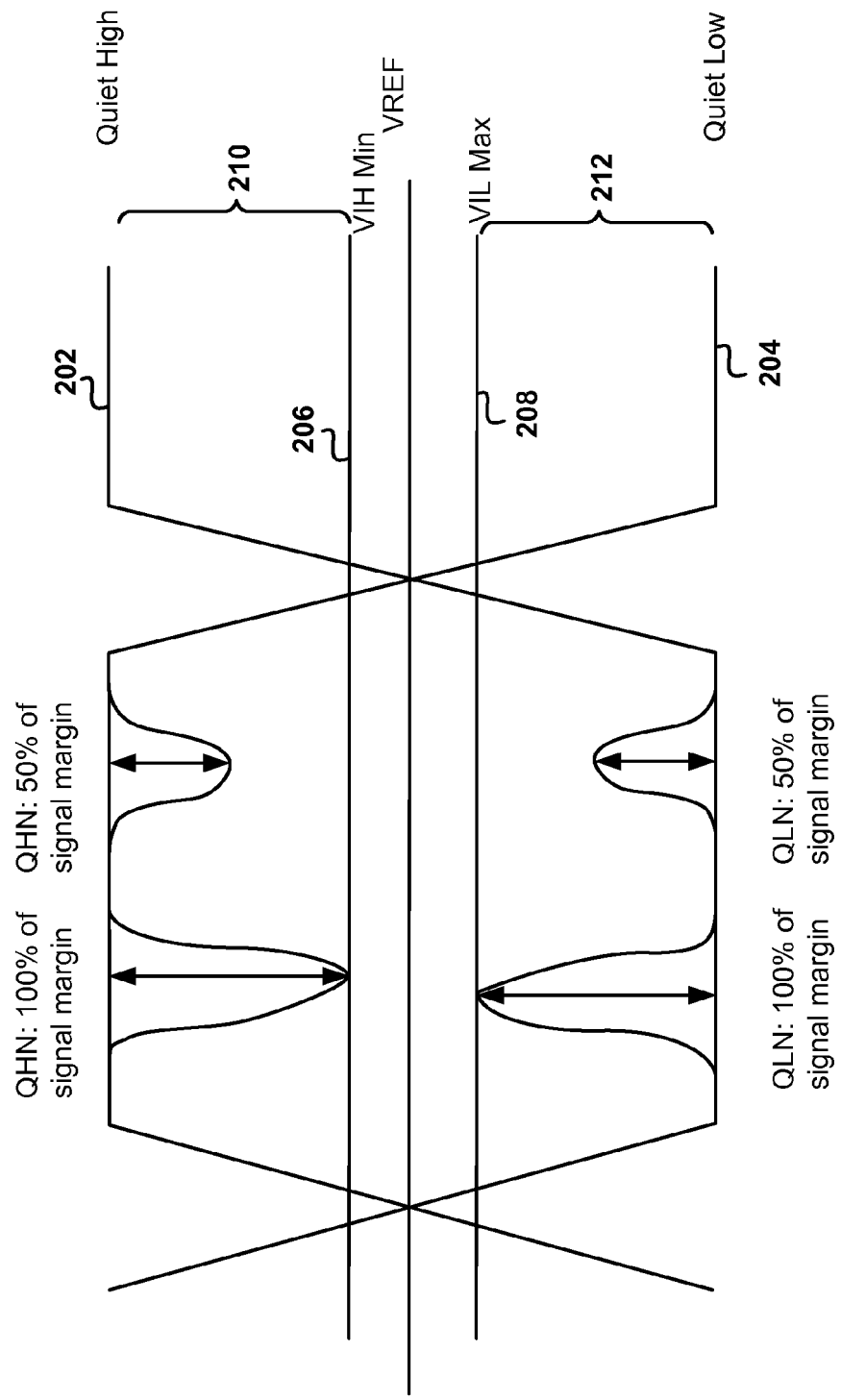
FIG. 2 depicts the effects of noise on a signal and the sensitivity to noise for different types of interference.

FIG. 2 depicts the effects of noise on a signal and the sensitivity to noise for different types of interference. In general, signals in the IC have a region between their quiet value and the value that would cause the signal to be interpreted incorrectly. The quiet value can be either Quiet High 202 or Quiet Low 204, and the respective thresholds that define the region where the signal is interpreted correctly are defined by voltage levels VIH Min 206 and VIL Max 208. VIH Min 206 is defined as the receiver minimum direct current (DC) Input High voltage, such that the final logic state is unambiguously defined, that is, once the receiver input has crossed this value, the receiver's logic state is ambiguous. Similarly, VIL Max 208 is defined as the receiver maximum DC Input Low Voltage. The region between the expected value and the corresponding threshold is defined as the quiet signal margin. Thus, region 210 between Quiet High 202 and VIH Min 206, and region 212 between Quiet Low 204 and VIL Max 208 define the quiet signal margins. If the noise injected by the aggressor is greater than this signal margin, a functional failure will result.

FIG. 3 shows I/O pin layout 302 with high Simultaneous Switching Noise (SSN) on victim pin 304. Since SSN is an interaction between two pins, the properties of those two pins directly or indirectly affect the noise induced by an aggressor on the victim. For example, as the current strength of an aggressor pin is increased, more noise is injected on the victim pin. Further, if the distance between pins decreases, the increased coupling will result in more switching noise between the pins. In the layout shown in FIG. 3, victim pin 304 is surrounded by aggressor pins 306. It can be readily appreciated that the close proximity of aggressor pins and the high number of aggressors result in a high level of induced SSN on pin 304.

FIG. 4 shows I/O pin layout 308 with lower SSN impact on victim pin 304 than in the layout of FIG. 3. Since the distance from victim pin 304 to the aggressor pin 306 is greater, the SSN on victim pin 304 is reduced from the layout of FIG. 3. To achieve a balanced optimization during placement, a new placement cost is introduced to allow the placement module to optimize SSN. The cost function $cost_{ij}$ for a single pin i to be placed near a pin j is defined as:

$$\cos t_{ij} = f(pin_i, pin_j) \quad (1)$$

Furthermore, the SSN cost of pin location i is defined as $cost_i$:

$$cost_i = \sum_j f(pin_i, pin_j) \quad (2)$$

Index j is used to include all other pins in a region defined around pin i. This region may be the entire chip or a subset of the entire chip. The choice of region is dependent on the cost function f and the configuration of the algorithm parameters in the placement module. To determine the cost for the entire chip, all the costs for the individual pins are added up:

$$cost = \sum_i^{chip} cost_i = \sum_i^{chip} \sum_j^{region} f(pin_i, pin_j) \quad (3)$$

To determine the cost of a move, the placement module evaluates the costs before and after the move and then the difference between the cost after the move and the cost before the move is calculated. If the difference is negative then the move is beneficial because the cost related to SSN is less after the move, which means a lower amount of SSN in the pin layout after the move. This difference or delta in the SSN cost is considered with all the other cost deltas estimated for other performance parameters to evaluate whether or not to accept a pin move, as previously discussed in reference to FIG. 1.

In one embodiment, the SSN cost function f is defined as:

$$f(pin_i, pin_j) = \frac{metric_i \cdot metric_j}{distance_{ij}} \quad (4)$$

To keep runtime low, the placement module uses a proxy metric to evaluate the SSN cost instead of performing a complete SSN simulation, which would be prohibitively expensive. In one embodiment, the proxy metric for pin i, named $metric_i$, is defined as the current strength of pin i in integer milliamps. This proxy metric is an effective rough estimator of SSN because of the strong correlation between the current strength and the injected noise and because this proxy metric is relatively easy to calculate. Since SSN is proportional to the current strength of the aggressor, the proxy metric is higher for pins inducing larger amounts of noise. The current strength of a pin is independent of the location of the pin and can be pre-computed in advance and cached in the initial cost computation to save runtime processing. In other embodiments, other proxy metrics can be used, such as the I/O voltage on the pin $V_{cc}IO$, the slew rate, the transmission rate of the pin, etc. In yet another embodiment, different SSN metrics are combined to further refine the estimate of SSN cost.

Since the cost function f makes use of the inverse of the distance between pins $distance_{ij}$, the cost function f decreases when the distance increases. In one embodiment, a square sliding window centered on the victim pin is used as the region to estimate the effects of nearby pins on the victim pin. In other embodiments, the sliding window can be a circle, a rectangle, a triangle, a pentagon, an octagon, or any other geometric figure centered on the victim pin. Using an appropriate sized sliding window, runtime can be lowered without significantly affecting the final result. As a result, the cost function cost, for pin i is calculated as:

$$cost_i = \sum_j^{window} \frac{metric_i \cdot metric_j}{d_{ij}} \quad (5)$$

In one embodiment, $d_{ij}$ in equation (5) represents the Cartesian distance between pin i and pin j on the package, not the die. The distance of pins on the package is used because the pads are laid out as a ring on the die, and the die pin layout is not correlated with SSN as strongly as the package pin layout. In another embodiment, the distance of the pins on the die layout is used for $d_{ij}$. This divisor penalizes pins that are close together and therefore have high mutual inductance. Therefore, the cost of the entire chip is the sum of the costs for each individual pin:

$$cost = \sum_i^{chip} \sum_j^{window} \frac{metric_i \cdot metric_j}{d_{ij}} \quad (6)$$

Figure 5:
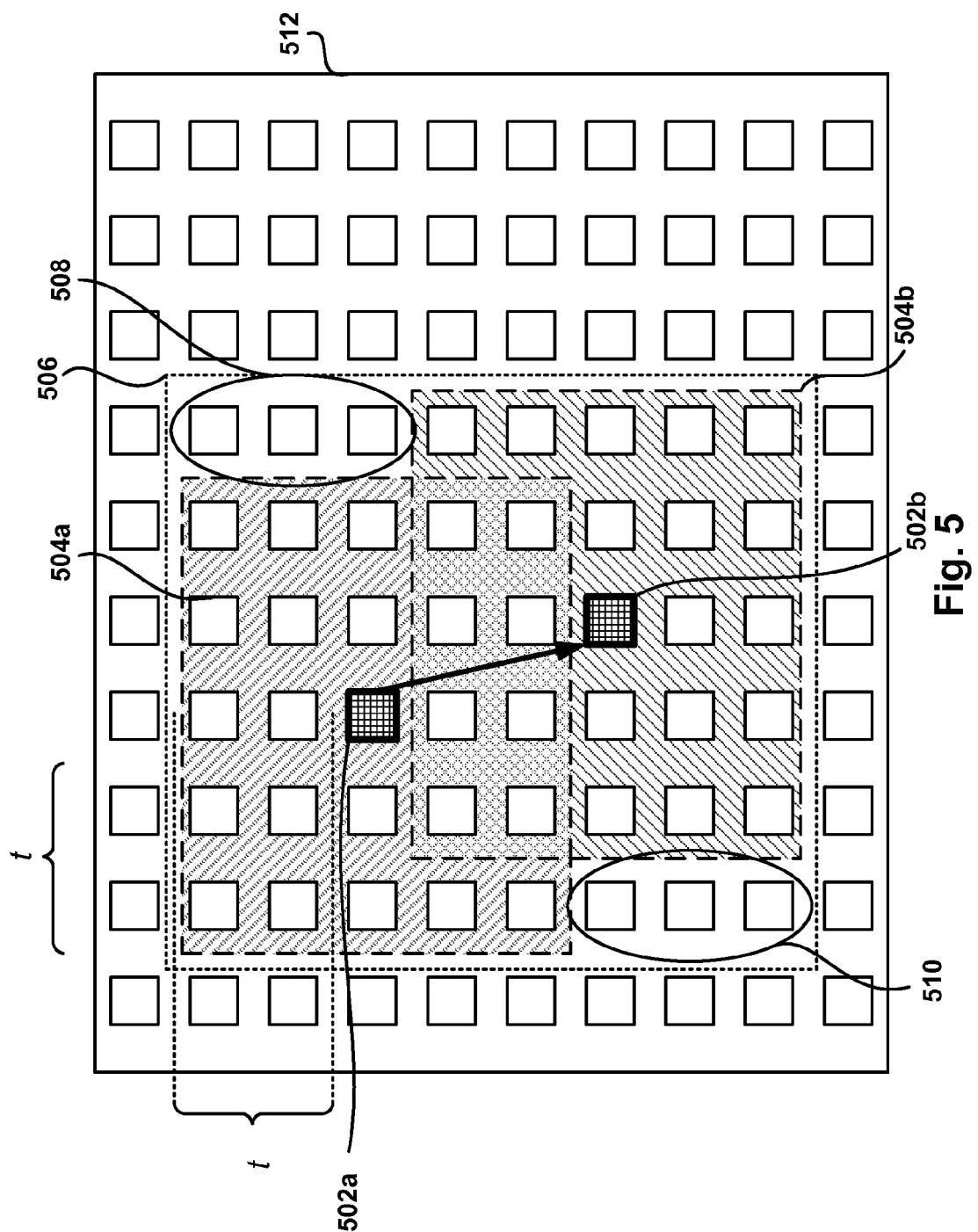
FIG. 5 illustrates which pins require a new computation of the SSN cost after moving a pin in the I/O layout in accordance with one embodiment of the invention.

FIG. 5 illustrates which pins require a new computation of the SSN cost after moving a pin in the I/O layout in accordance with one embodiment of the invention. Each possible pin location in layout 512 is represented as a square. The sliding window 504a for pin 502a is defined to include any other pin which is within a predetermined horizontal and vertical distance t from pin 502a. In FIG. 5, t is equal to 2, where the unit for measuring t is the distance between two adjacent pins. Thus, the resulting sliding windows 504a and 504b are squares of side 2t+1. Using sliding windows ensures that a move will only affect pins within a distance of t from the either the source or the destination pin location during the move. The cost calculation is optimized by limiting the number of pins whose cost needs to be recalculated. In one embodiment, the area for recomputation of the cost function is defined as the union of the sliding windows for the moving pin before and after the move. In FIG. 5, the recomputation area for this approach is the union of regions 504a and 504b when pin 502a is moved to pin 502b.

In another embodiment, a bounding box is defined to control the area of recomputation. This bounding box is defined by two corners selected from the corners of the regions before and after the move, such that the bounding box includes both regions. In mathematical terms, if a pin with coordinates $(x_1,y_1)$ is moved to a new location with coordinates $(x_2,y_2)$ then the area of recomputation is bounded by:

$$(\min(x1,x2)-t, \min(y1,y2)-t) \text{ and } (\max(x1,x2)+t, \min(y1,y2)+t) \quad (7)$$

In FIG. 5, bounding box 506 would be use for the recomputation area when moving pin 502a to 502b. It should be appreciated that pins in regions 508 and 510 would be included in the recomputation although regions 508 and 510 are not inside any of the pin windows. These extra computations may be runtime worthy due to the simpler resulting recomputation area. The choice of which method to use depends largely on the complexity of the cost function.

Figure 6B:
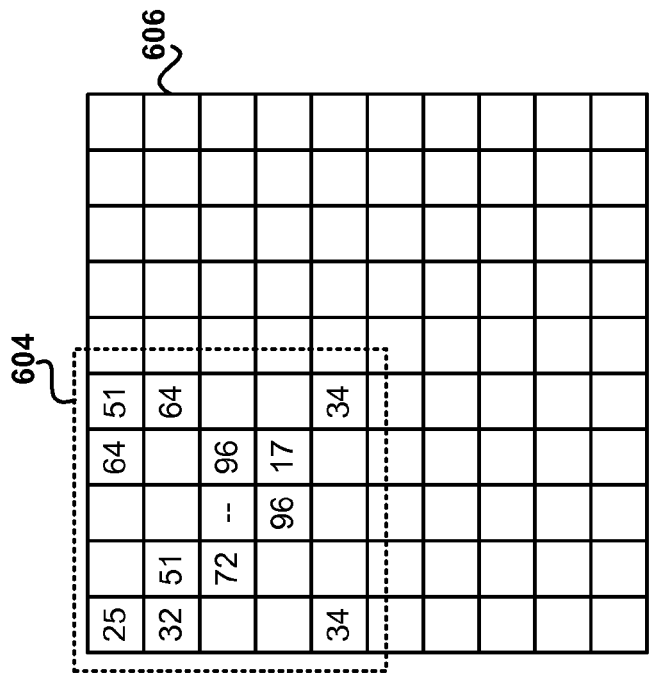
FIGS. 6A-B illustrate an I/O pin layout with the corresponding pin cost metrics and the calculation of the SSN cost for a victim pin in accordance with one embodiment of the invention.
Figure 6A:
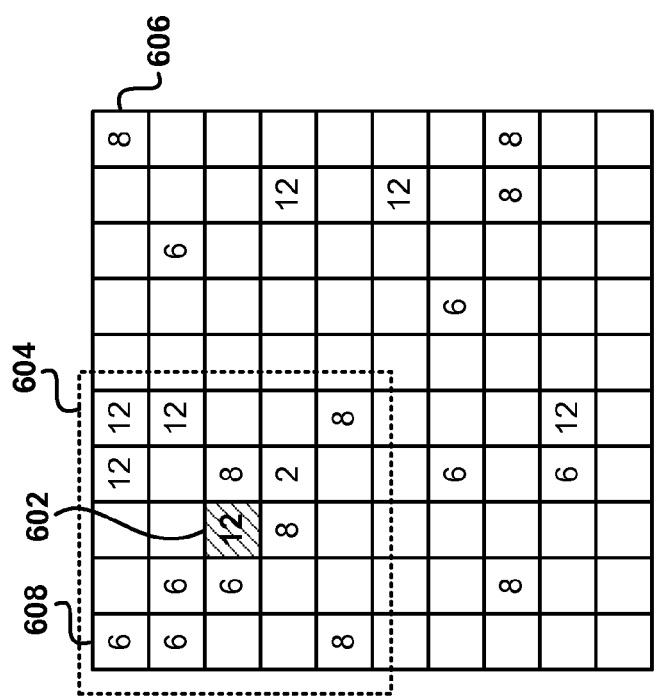

FIGS. 6A-B illustrate I/O pin layout 606 with the corresponding pin cost metrics and the calculation of the SSN cost for a victim pin in accordance with one embodiment of the invention. FIG. 6A illustrates I/O pin layout 606, where each pin includes the value of the proxy metric, which in this case is the current strength of the pin in milli-Amps, as previously discussed. FIG. 6B illustrates the computation of the SSN cost for the pin at pin location 602. To compute the cost for pin location 602, region 604 is defined and centered on pin location 602, with dimensions 5×5. Equation (4) is used to calculate the cost factors for each of the pins in region 604. For example, to estimate the SSN cost caused by the pin at pin location 608 on the pin at pin location 602, equation (4) delivers the following value:

$$f(pin_{602}, pin_{608}) = \frac{metric_{602} \cdot metric_{608}}{distance_{602-608}} = \frac{12 \cdot 6}{\sqrt{2^2+2^2}} = \frac{72}{2\sqrt{2}} = 25.45 \quad (4)$$

Figure 7B:
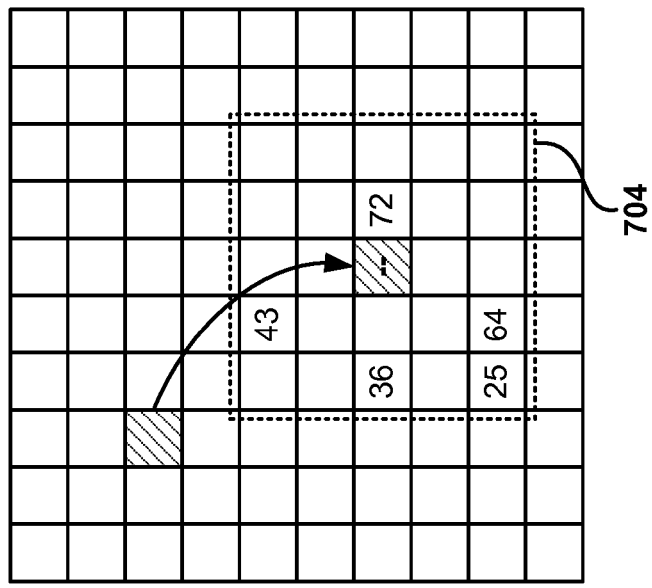
FIGS. 7A-B illustrate the effects of moving a pin and the recalculation of the SSN pin after the move in accordance with one embodiment of the invention.
Figure 7A:
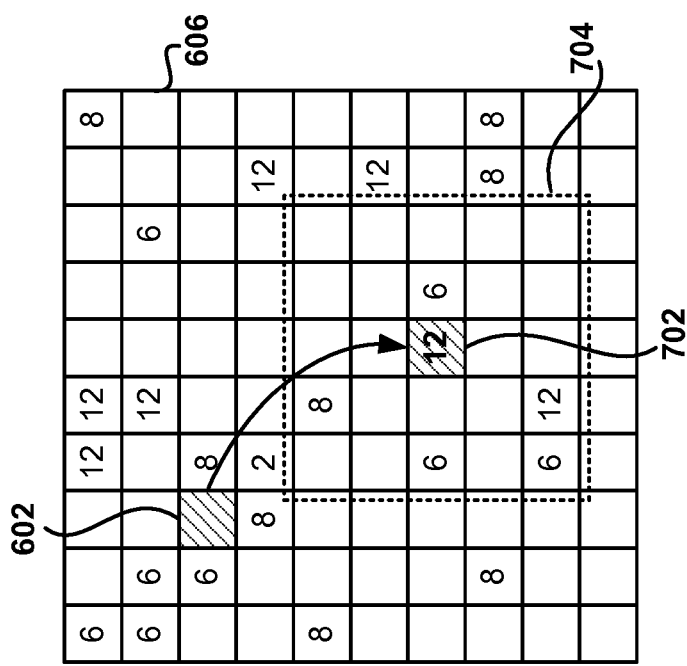

When all the costs in region 604 are added up, the SSN cost on pin location 602 is equal to 636. FIGS. 7A-B illustrate the effects of moving the pin from pin location 602 and the recalculation of the SSN pin after the move in accordance with one embodiment of the invention. FIG. 7A shows the pin at pin location 602 being moved to pin location 702. The cost on pin location 702 can be calculated as previously discussed in reference to FIGS. 6A-B. Region 704 around pin location 702 defines the new area to calculate the SSN cost for pin location 702. FIG. 7B shows the result of this calculation where the SSN cost for pin location 702 is equal to 240. The cost for the pin after moving from pin location 602 has decreased from 636 to 240, therefore this move would decrease the SSN noise experienced by the pin. However, to make a final determination, the costs for the pins affected in the move would have to be recomputed and it will be determined that the move is beneficial from an SSN perspective by calculating the total SSN cost delta for all the pins affected. The total SSN costs before and after the move can be obtained by applying equation (6) to add the costs for all the pins. The calculation for the total SSN cost after the move would use the original SSN costs for those pins not affected by the move and the newly calculated costs for the pins affected by the move. In one embodiment, the total SSN cost delta is calculated as the delta between the total SSN cost before and after the move. In another embodiment, the total SSN cost delta is calculated by obtaining partial SSN costs that include only the pins affected by the move. The total delta SSN cost is then equal to the delta of the partial SSN costs.

In one embodiment, experimental measures have given an average 5-7% improvement in the available signal margin with no apparent performance impact on the IC design. However, other improvement values are also possible depending on other factors, such as the IC characteristics, the pin layout, other performance parameters, etc.

Figure 8:
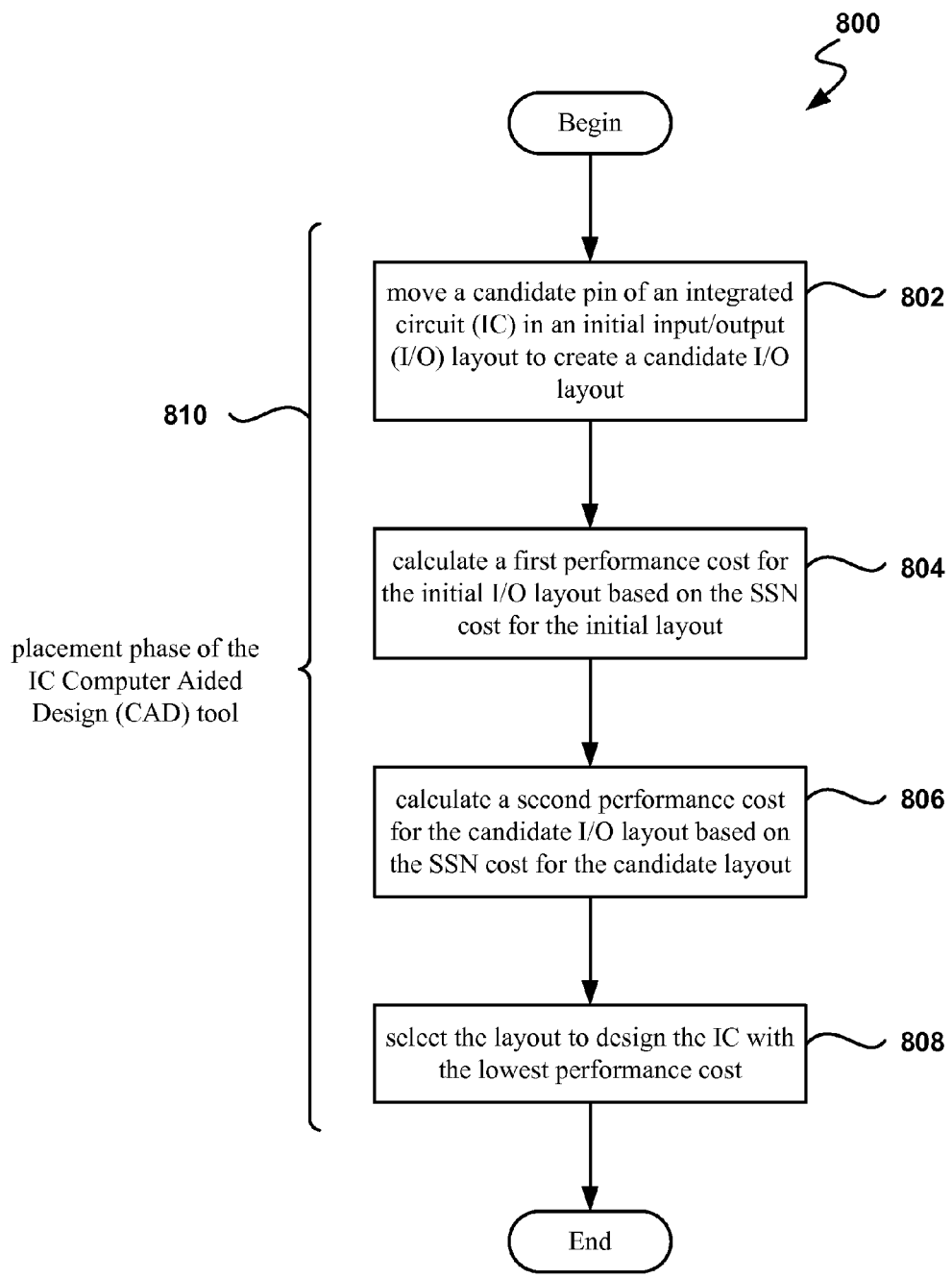
FIG. 8 shows the process flow for minimizing SSN in the design of an IC in accordance with one embodiment of the invention.

FIG. 8 shows process flow 800 for minimizing SSN in the design of an IC in accordance with one embodiment of the invention. In operation 802, a candidate pin of the IC in an initial input/output (I/O) layout is moved to create a new candidate I/O layout. See for example, pin 304 of FIGS. 3 and 4, pin 502a of FIG. 5, and pin 602 of FIGS. 6A-7B. After the new candidate layout is created, in operation 804 the method calculates a first performance cost for the initial I/O layout based on the SSN cost for the initial layout. In operation 806, a second performance cost for the candidate I/O layout is calculated based on the SSN cost for the candidate layout. See for example the SSN cost calculations previously described in reference to FIGS. 6B and 7B, and equation (6).

After operation 806, the method flows to operation 808 where a layout is selected to design the IC with the lowest performance cost. It should be noted that operations 802, 804, 806, and 808 are performed by a CAD tool during a placement phase 810 of the CAD tool.

Figure 9:
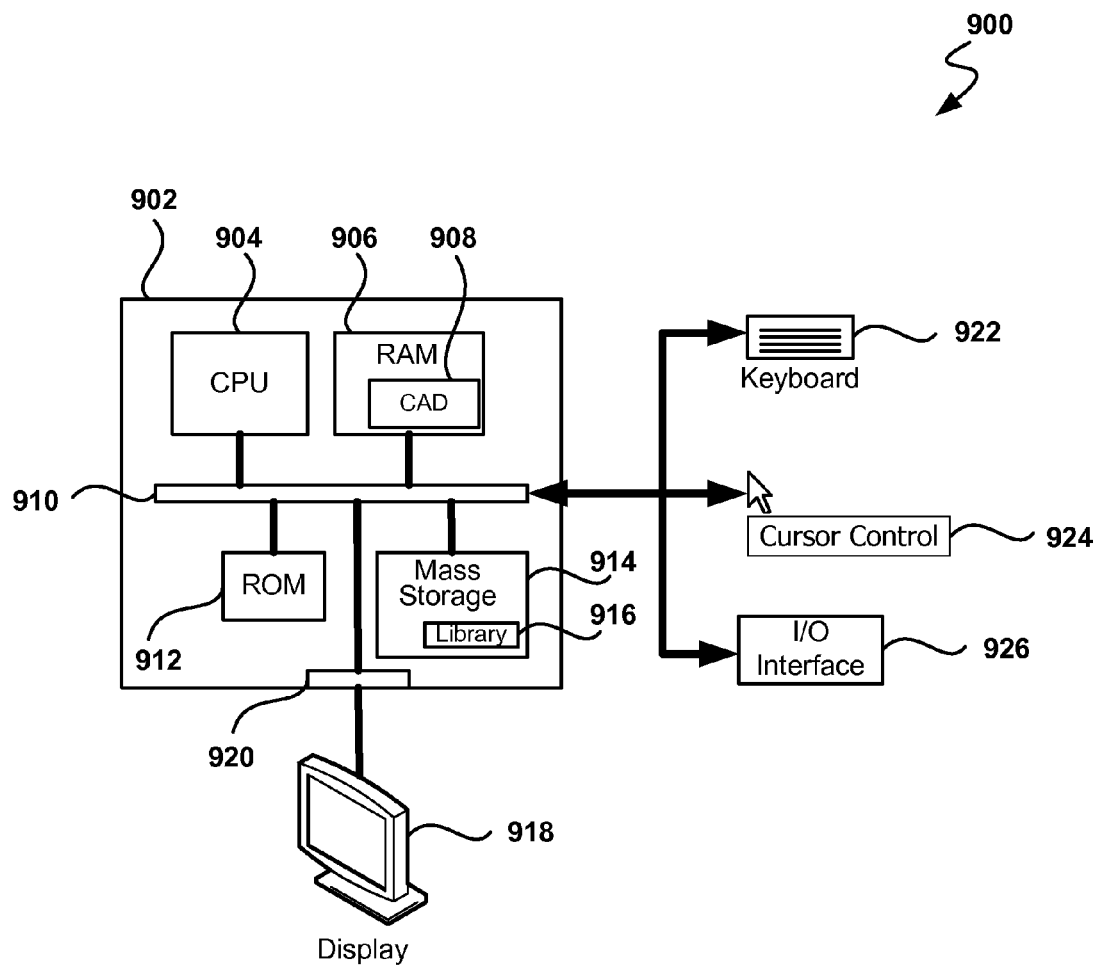
FIG. 9 is a simplified schematic diagram of a computer system for implementing embodiments of the present invention.

FIG. 9 is a simplified schematic diagram of computer system 1000 for implementing embodiments of the present invention. It should be appreciated that the methods described herein may be performed with a digital processing system, such as a conventional, general-purpose computer system. Special purpose computers, which are designed or programmed to perform only one function may be used in the alternative. In addition, the computer system of FIG. 9 may be used to perform IC simulations. The computer system includes a central processing unit (CPU) 904, which is coupled through bus 910 to random access memory (RAM) 906, read-only memory (ROM) 912, and mass storage device 914. IC CAD program 908 includes program instructions to perform embodiments of the invention that improve SSN on I/O pins. IC CAD program 908 resides in random access memory (RAM) 906, but can also reside in mass storage 914.

Mass storage device 914 represents a persistent data storage device such as a floppy disc drive or a fixed disc drive, which may be local or remote. IC simulation model 916 resides in mass storage device 914, but can also reside in RAM 906 during processing. Model 916 may contain circuit models for performing IC simulations. It should be appreciated that CPU 904 may be embodied in a general-purpose processor, a special purpose processor, or a specially programmed logic device. Display 918 is in communication with CPU 904, RAM 906, ROM 912, and mass storage device 914, through bus 910 and display interface 920. Of course, display 918 is configured to display the user interfaces described herein. Keyboard 922, cursor control 924, and input/output interface 926 are coupled to bus 910 in order to communicate information in command selections to CPU 904. It should be appreciated that data to and from external devices may be communicated through input output interface 926.

The methods, computer programs, and systems for minimizing SSN in the design of an IC, described herein may be incorporated into any suitable integrated circuit. For example, the methods, computer programs and systems may be incorporated into other types of programmable logic devices such as programmable array logic (PAL), programmable logic array (PLA), field-programmable gate array (FPGA), field programmable logic array (FPLA), electrically programmable logic devices (EPLD), electrically erasable programmable logic device (EEPLD), logic cell array (LCA), application-specific integrated circuit (ASIC) just to name a few. The programmable logic device may be a part of a data processing system that includes one or more of the following components: a processor, memory; I/O circuitry, and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method to reduce Simultaneous Switching Noise (SSN) in an Integrated Circuit (IC) design, the method comprising:
   moving a candidate pin of the IC design in an initial input/output (I/O) layout to create a candidate I/O layout;
   calculating a first performance cost for the initial I/O layout and a second performance cost for the candidate I/O layout, wherein the first and second performance costs are based on an SSN cost for the initial I/O layout and on an SSN cost for the candidate I/O layout respectively,
   wherein calculating the SSN cost for the candidate I/O layout includes,
      prior to said moving, establishing a bounding box which includes pins in a first region centered around the candidate pin;
      subsequent to said moving, establishing a bounding box which includes pins in a second region centered around the candidate pin;
      recalculating the pin cost functions for the pins in the bounding box; and
   selecting a layout for the IC design that has a lower performance cost, wherein at least one method operation is executed through a processor.

2. The method of claim 1, further including:
   calculating the SSN cost for the initial I/O layout, the calculating the SSN cost for the initial I/O layout including,
   calculating a pin cost function for each pin of a plurality of pins in the layout; and
   adding the pin cost functions to obtain the SSN cost for the initial I/O layout.

3. The method of claim 1, further including:
   determining a pin cost metric for estimating SSN.

4. The method of claim 3, wherein calculating the pin cost function for a given pin further includes:
   determining a partial cost associated with each pin of the plurality of region pins, wherein the partial cost is based on a pin cost metric of the given pin, a pin cost metric of each region pin of the plurality of region pins, and an inverse of a distance between the given pin and each region pin of the plurality of region pins; and
   summing partial costs from each pin of the plurality of region pins.

5. The method of claim 1, further including:
   repeating the moving, calculating the first and the second performance costs, and selecting, for a plurality of possible pin moves.

6. The method of claim 5, further including:
   selecting a possible pin move from said plurality of possible pin moves through simulated annealing.

7. The method of claim 5, wherein a criterion for the possible pin moves is selected from a group consisting of improving a specific region, improving a specific path, improving SSN noise for a pin with a worst SSN margin, or performing a random move.

8. The method of claim 1, wherein calculating the first performance cost further includes:
calculating a weighted average of the SSN cost for the initial I/O layout and other performance metrics for the IC design.

9. The method of claim 1, wherein the method is executed during a placement phase of an IC Computer Aided Design (CAD) tool.

10. The method of claim 1, wherein the IC is a programmable logic device.

11. A computer program embedded in a computer-readable storage medium, when executed by one or more processors, for reducing Simultaneous Switching Noise (SSN) in Integrated Circuit (IC) design, the computer program comprising:
program instructions for moving a candidate pin of the IC in an initial input/output (I/O) layout to create a candidate I/O layout;
program instructions for calculating a first SSN cost for the initial I/O layout and a second SSN cost for the candidate I/O layout, the program instruction for calculating further comprising:
program instructions for recalculating the pin cost function for pins within a bounding box; and
program instructions for using the pin cost functions obtained during the first SSN cost calculation for pins outside the bounding box; and
program instructions for selecting a layout to design the IC with a lowest SSN cost;
wherein the computer program performs placement operations in an IC Computer Aided Design (CAD) tool.

12. The computer program as recited in claim 11, wherein calculating the first SSN cost further includes:
program instructions for calculating a pin cost function for each of a plurality of pins in the layout, the calculating the pin cost function for each pin including,
establishing a square region for the bounding box, the square region centered around the plurality of pins each pin, the square region encompassing square region pins;
determining a partial cost associated with each pin for each of the square region pins, wherein the partial cost is based on a pin cost metric of each of the each square region pins, a pin cost metric for the of a pin defining the square region pins, and an inverse of a distance between the pin defining the square region pins and each of the square region pins; and
summing partial costs of each of the square region pins.

13. The computer program as recited in claim 12, wherein the pin cost metric is a current strength of the pin defining the square region.

14. The computer program as recited in claim 12, wherein a parameter for the pin cost metric is selected from a group consisting of a slew rate of the pin, a clock frequency of the pin, or a communications protocol of the pin.

15. The computer program as recited in claim 11, wherein the candidate pin is moved to another location within a cluster where the candidate pin is located.

16. The computer program as recited in claim 15, wherein the candidate pin has coordinates (x1, y1) before the move and (x2, y2) after the move, wherein d is a distance parameter, wherein the bounding box is a square defined by a first corner and a second corner, wherein the first corner has coordinates of a minimum of x1 and x2 minus d and a minimum of y1 and y2 minus d, wherein the second corner has coordinates of a maximum of x1 and x2 plus d and a maximum of y1 and y2 plus d.

17. The computer program as recited in claim 15, wherein the candidate pin has coordinates (x1, y1) before the move and (x2, y2) after the move, wherein d is a distance parameter, wherein the bounding box is a union of a first square and a second square, a center of the first square being (x1, y1), a center of the second square being (x2, y2), a side of the first square and a side of the second square being equal to two times d plus 1.

18. The computer program as recited in claim 11 further comprising:
storing the program instructions in a memory associated with the IC Computer Aided Design (CAD) tool.

* * * * *